US007952863B1

(12) United States Patent
Stifal

(10) Patent No.: US 7,952,863 B1
(45) Date of Patent: *May 31, 2011

(54) DISPLAY MOUNT

(75) Inventor: Matthew William Stifal, Portage, IN (US)

(73) Assignee: Peerless Industries, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,466

(22) Filed: May 17, 2010

Related U.S. Application Data

(63) Continuation of application No. 12/624,134, filed on Nov. 23, 2009, now Pat. No. 7,738,245.

(51) Int. Cl.
*G06F 1/16* (2006.01)
*H05K 5/00* (2006.01)
*H05K 7/00* (2006.01)

(52) U.S. Cl. .................. 361/679.21; 248/917; 348/837

(58) Field of Classification Search .......... 361/679.01–679.02, 679.21, 679.58, 361/679.6; 248/917; 348/837
See application file for complete search history.

(56) References Cited

U.S. PATENT DOCUMENTS

| D312,185 S | 11/1990 | Prater, Sr. |
|---|---|---|
| D314,483 S | 2/1991 | Zimpriech et al. |
| 4,993,676 A | 2/1991 | Fitts et al. |
| D316,790 S | 5/1991 | Robbins et al. |
| 5,064,161 A | 11/1991 | Anderson |
| 5,148,282 A | 9/1992 | Sedighzadeh |
| D333,061 S | 2/1993 | Sedighzadeh |
| D333,398 S | 2/1993 | Sedighzadeh et al. |
| D334,861 S | 4/1993 | Cheng |
| D350,664 S | 9/1994 | Vogels |
| 5,405,117 A | 4/1995 | Davis |
| D365,951 S | 1/1996 | Walters, III |
| D377,897 S | 2/1997 | Vogels |
| D388,646 S | 1/1998 | Canton Gongora et al. |
| D392,131 S | 3/1998 | Flagg |
| D394,570 S | 5/1998 | Walters, III |
| 5,797,568 A | 8/1998 | Canton Gongora et al. |
| D410,836 S | 6/1999 | Vogels |
| 6,343,006 B1 | 1/2002 | Moscovitch et al. |
| 6,554,238 B1 | 4/2003 | Hibberd |
| 6,639,789 B2 | 10/2003 | Beger |
| 6,695,265 B2 | 2/2004 | Neuhof et al. |
| 6,739,096 B2 | 5/2004 | Feldpausch et al. |
| D493,800 S | 8/2004 | Pfister et al. |
| 6,857,610 B1 | 2/2005 | Conner et al. |
| 7,061,754 B2 | 6/2006 | Moscovitch |
| D528,901 S | 9/2006 | David |
| D538,141 S | 3/2007 | Stenhouse et al. |

(Continued)

OTHER PUBLICATIONS

Non-Final Office Action for U.S. Appl. No. 29/344,808, dated Nov. 2, 2009.

(Continued)

*Primary Examiner* — Jayprakash N Gandhi
*Assistant Examiner* — Adrian S Wilson
(74) *Attorney, Agent, or Firm* — Foley & Lardner LLP

(57) ABSTRACT

A mounting system for mounting a plurality of devices to a surface, including an overhead surface. According to various embodiments, a support arm is configured to operatively attach to a mounting surface and is operatively connected to a plurality of device support assemblies that include a mount bracket a selectively moveable tilt bracket. A device support member is operatively coupled to the tilt brackets and configured to operatively attach to at least one display device such as a flat panel display. The device support member, and attached devices, are selectively tiltable to a tilt angle.

24 Claims, 5 Drawing Sheets

U.S. PATENT DOCUMENTS

| | | | |
|---|---|---|---|
| 7,195,214 | B2 | 3/2007 | Lee et al. |
| D546,610 | S | 7/2007 | Blanchard |
| D560,668 | S | 1/2008 | Pritchard et al. |
| 7,320,454 | B2 | 1/2008 | Lee et al. |
| D563,700 | S | 3/2008 | Walters et al. |
| D565,399 | S | 4/2008 | Grey |
| D566,444 | S | 4/2008 | Grey |
| D568,321 | S | 5/2008 | Gillespie |
| D568,322 | S | 5/2008 | Gillespie et al. |
| D568,323 | S | 5/2008 | Gillespie et al. |
| 7,395,996 | B2 | 7/2008 | Dittmer |
| 7,438,269 | B2 | 10/2008 | Pfister et al. |
| D581,914 | S | 12/2008 | Bures et al. |
| D591,756 | S | 5/2009 | Wohlford et al. |
| 7,607,620 | B2 | 10/2009 | Ozolins et al. |
| D610,381 | S | 2/2010 | Stifal |
| D614,896 | S | 5/2010 | Stifal |
| 2002/0011544 | A1 | 1/2002 | Bosson |
| 2004/0118984 | A1 | 6/2004 | Kim et al. |
| 2004/0251390 | A1 | 12/2004 | Wachob |
| 2005/0051692 | A1 | 3/2005 | Jung et al. |
| 2008/0117578 | A1 | 5/2008 | Moscovitch |
| 2008/0128574 | A1 | 6/2008 | Walters et al. |
| 2008/0284676 | A1 | 11/2008 | Moscovitch |
| 2009/0021655 | A1 | 1/2009 | Walters |
| 2009/0079665 | A1 | 3/2009 | Moscovitch |

OTHER PUBLICATIONS

Non-Final Office Action for U.S. Appl. No. 29/344,842, dated Nov. 2, 2009.

Model PM-D—Dual Plasma Bracket, Video Furniture International, http://www.video-furn.com, Sep. 23, 2009.

Plasma Swivel Mount and Plasma Screen Mount, ERGO In Demand, http://www.ergoindemand.com/plasma-swivel-screen-mount.htm, Sep. 22, 2009.

Jumbo DLP Ceiling Mount, HT Market, http://www.htmarket.com/jmc-dlp50.html, Sep. 23, 2009.

Telescopic Pole LCD Ceiling Mount, Sallas Industrial Co., Ltd., http://www.allproducts.com/showcase/sallas/Product-200478221918.html, Sep. 22, 2009.

Advance Quick Link® Plasma Ceiling Mounts, Dalite, http://www.dalite.com, Sep. 22, 2009.

Peerless PLCK-1-Flat Panel Conversion Kit for up to 50" Flat Panels (wo/ adapter plate), Peerless Industries, Inc., http://ww-wracksandstands.com/Peerless-PLCK-1-PE1173.html, Sep. 22, 2009.

2C Ceiling Mounting Brackets for Panels, 2C Overhead IT, 2C Display Accessories, http://www.2cdisplays.com.au/html/2C_products_panel_ceiling.html, Sep. 23, 2009.

PAC722 Dual Side-by Side Accessory, Chief, http://chiefmfg.com/productdetail.aspx?AccessoryID=1089, Sep. 29, 2009.

"Installation and Assembly: Solid Point™ FlatPanel Street Column Ceiling Mount," Peerless Industries, Inc., Feb. 16, 2006.

"Installation and Assembly: Custom Dual Screen Ceiling Mount," Peerless industries, Inc., Nov. 6, 2007.

"Installation and Assembly: Custom Double Mount," Peerless Industries, Inc., Apr. 19, 2007.

Dual and Quad TV Monitor Mounts—Multi Mount TV Pedestal and Ceiling Systems, ERGO In Demand, http://www.ergoindemand.com/dua-quad-mounts.htm, Sep. 22, 2009.

TKLA-7837, Fogim Enterprise Corporation, http://www.fogim-ent.com, 2008.

Peerless (ACC912) Lightweight Cathedral Ceiling Adapter, Peerless Industries, Inc., http://www.projectorzone.com/Peerless-ACC912, Sep. 22, 2009.

VMPU—100L Wall Mounts; AVTEQ, http://www.avteq.net, Sep. 23, 2009.

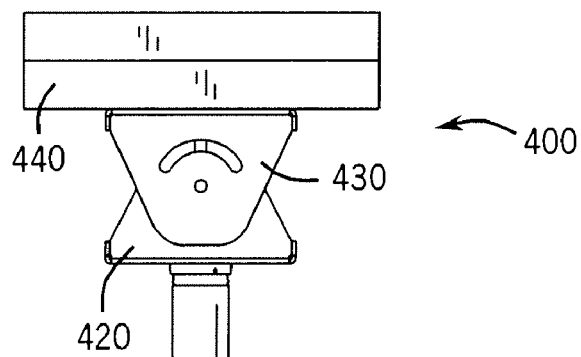
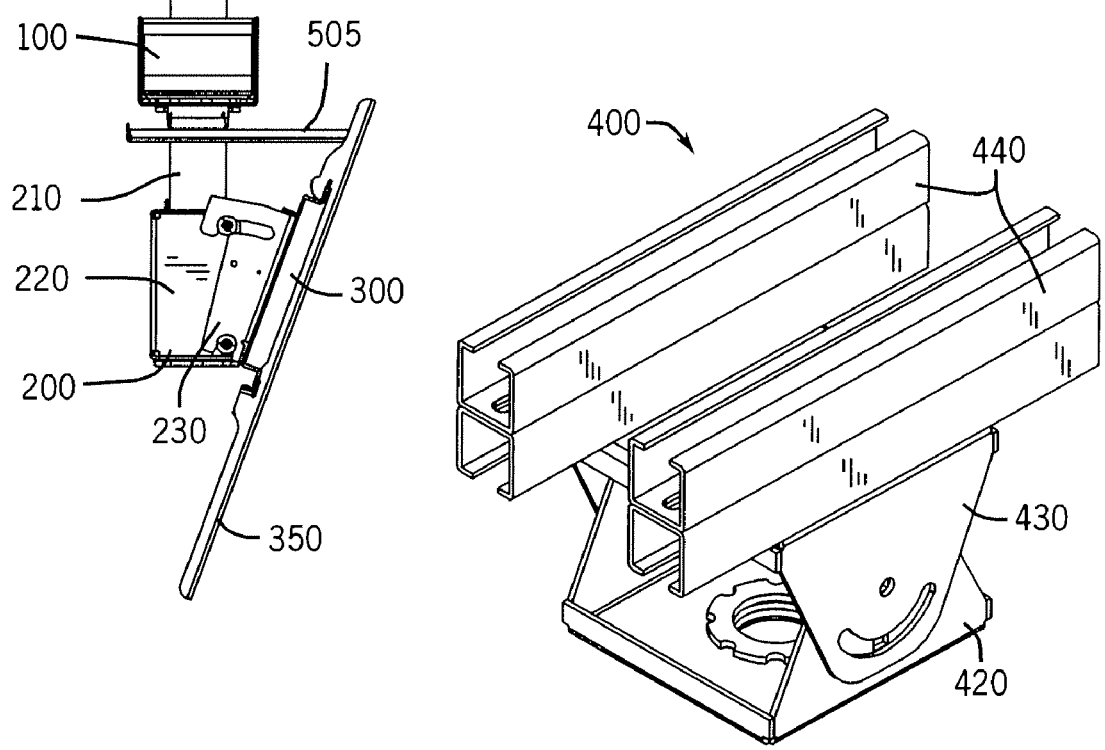
FIG. 5
FIG. 3

DISPLAY MOUNT

CROSS REFERENCE TO RELATED APPLICATIONS

This application in a continuation of U.S. patent application Ser. No. 12/624,134, filed Nov. 23, 2009. The contents of this application is incorporated herein by reference in its entirety.

FIELD OF THE INVENTION

The present invention relates generally to mounting systems for devices. More particularly, the present invention relates to mounting systems for mounting multiple flat-panel displays and similar devices.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In recent years, flat panel televisions have become enormously popular in both commercial and residential sectors. As the prices for plasma and liquid crystal display (LCD) flat panel displays have continued to fall, and the quality for the same devices have improved, more and more businesses and individuals have purchased such devices for both home and business purposes.

One of the advantages of flat panel television units that customers have found particular appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television.

Flat panel displays, on the other hand, may be mounted directly to a wall or other surface. With these considerations in mind, there have been various attempts to develop mounting systems that address mounting of flat panel display devices. Besides wall mounts, there have been various attempts to produce overhead mounts capable of suspending a display from a ceiling. Still other mounts have been developed that enable simultaneous mounting of multiple displays.

SUMMARY

Various embodiments comprise systems for mounting multiple display devices, including multiple LCD and plasma flat panel displays. The present mounting systems are particularly well suited to mounting a plurality of display devices from a ceiling or other overhead surface such as where a wall or similar surface may not be near or practical for mounting the displays. The mounting system is configured to mount multiple displays in a display plane that maintains the vertical alignment of the attached displays such that the displays are positioned at the same height and the orientation. The present mounting system may also be used for mounting displays to a wall or other horizontal surface. The mounting systems are further selectively adjustable to provide a desired tilt angle for the attached display devices to enhance viewing of the displays when mounted overhead.

In one set of embodiments, a display mount for mounting a plurality of displays to a surface comprises a surface bracket that is configured to operatively attach to an overheard surface, a support arm operatively coupled to the surface bracket, and a plurality of device mount assemblies operatively coupled to the support arm. Each of the plurality of device mount assemblies is configured to support at least one display device, and includes a mount bracket and a tilt bracket that is selectively moveable in relation to the mount bracket. The mounting system further comprises a device support member operatively connected to at least two of the plurality of tilt brackets and is configured to operatively attach to a plurality of display devices. The display mount may also include a rear cover operatively coupled to the support arm or other feature and configured to conceal at least the plurality of device mount assemblies and at least a portion of the plurality of display devices. Each of the tilt brackets is selectively tiltable in relation to the mount bracket such that the device support member and the attached display devices are selectively tiltable to a tilt angle.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 3 is a perspective view showing a surface mount assembly of the mounting system of FIG. 1;

FIG. 5 is a side view of the mounting system of FIG. 1, with the cover removed;

DETAILED DESCRIPTION OF VARIOUS EMBODIMENTS

Figure 1:
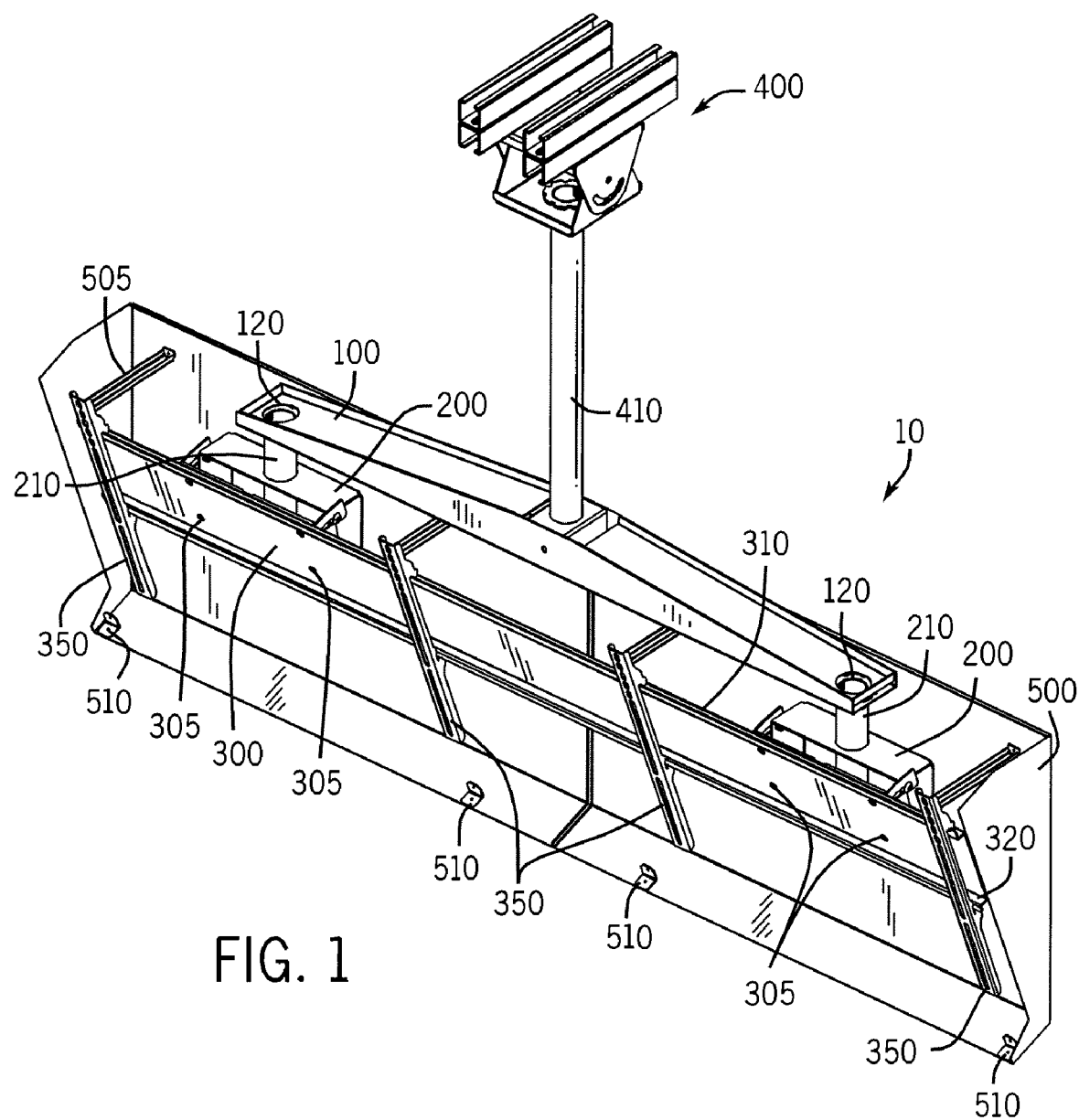
FIG. 1 is a perspective view of a mounting system constructed in accordance with an embodiment of the present invention.

FIGS. 1-7 illustrates a mounting system 10 constructed in accordance with an embodiment of the present invention. The mounting system 10 comprises a support arm 100 operatively coupled to a device mount assembly 200. The device mount assembly 200 is configured to operatively attach to a device such as a display device 20. A plurality of the device mount assemblies 200 may be operatively coupled to the support arm 100, with each device mount assembly 200 capable of supporting one or more displays. The mounting system 10 further comprises a device support member 300 operatively coupled to the device mount assemblies 200. The device support member 300 may be configured to operatively attach to one or more display devices. A plurality of device brackets 350 may be operatively coupled to the device support member 300 to facilitate attachment of the display devices 20. The mounting system 10 may further comprise a surface mount assembly 400 configured to operatively attach to a mounting surface (not shown) and operatively coupled to the support arm 100. The mounting system 10 may also include a rear cover 500 that conceals at least a portion of rear surfaces of the attached displays and the mounting system 10. As depicted in FIG. 1, the mounting system 10 is configured to support two display devices 20, such as two flat panel display devices 20, side-by-side and at the same height and tilt orientation. However, it will be appreciated that alternative device configurations may be achieved with the mounting system 10, and are within the scope of the systems described herein.

It should be understood that, as used herein, the phrases "operatively connected," "operatively coupled" and "operative attachment" do not require the specified components be directly connected or in direct physical contact with each other. Instead, an operative connection, coupling or attachment can involve the use of a number of intermediate components.

Figure 2:
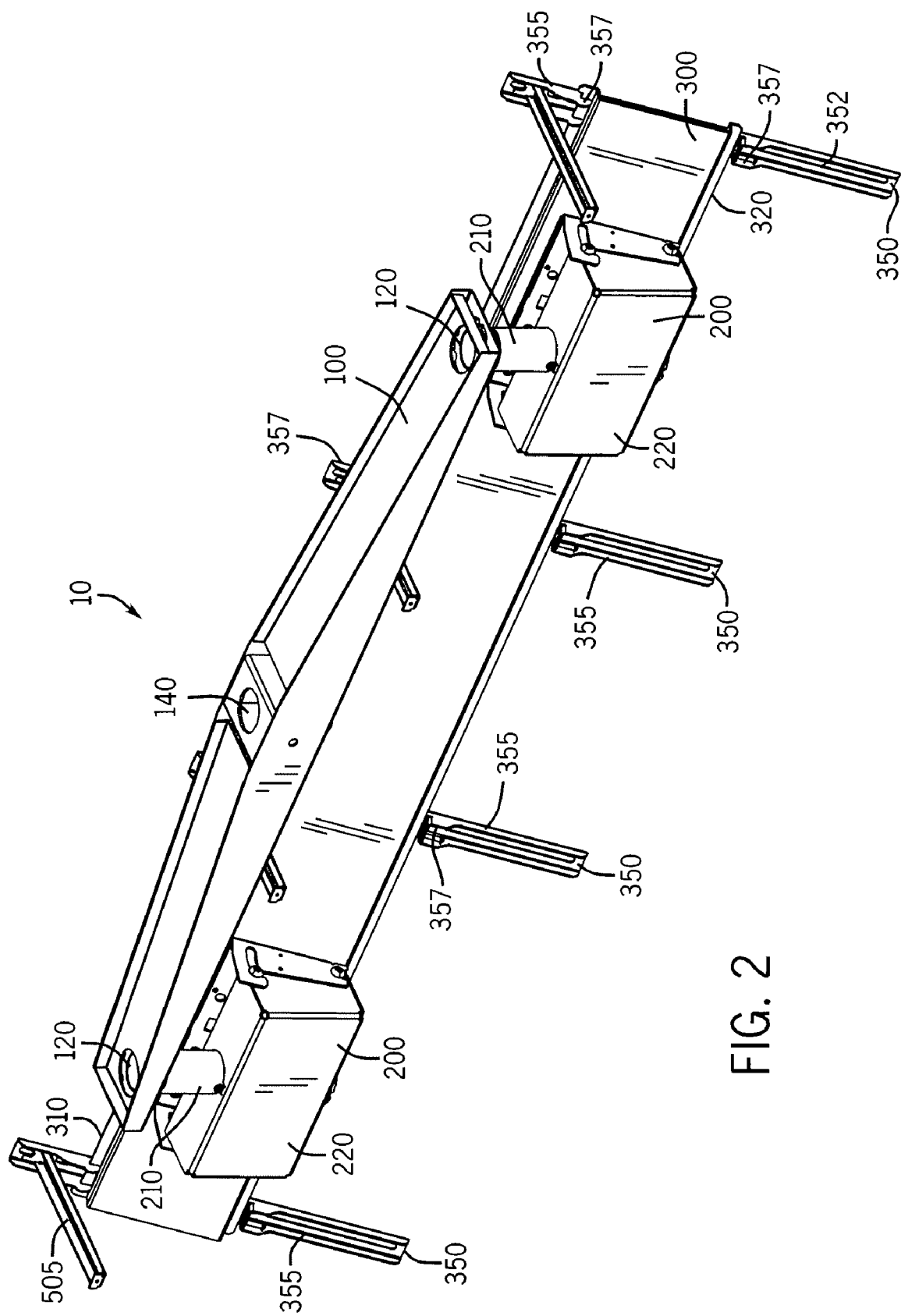
FIG. 2 is a reverse perspective view of the mounting system of FIG. 1, with certain features removed for clarity.

With reference to FIGS. 1 and 2, the support arm 100 generally comprises a member or a plurality of members capable of supporting the weight of two or more display devices attached to the mounting system 10. In the depicted configuration, the support arm 100 is an elongated member configured to support two devices in a side-by-side configuration. However, the support arm 100 may be configured to support other device configurations. For example, devices may be arranged rear-to-rear, orthogonally disposed, angularly disposed, top-to-bottom, offset, and combinations thereof. The support arm 100 can be of a fixed length as depicted. However, in other embodiments, the support arm 100 may have a selectively adjustable length to accommodate a variety of devices of various dimensions. For example, the support arm 100 may comprise an assembly of telescoping members that are selectively postionable to form a support arm 100 of adjustable length. Regardless of the specific configuration, it will be appreciated that the support arm 100 must be of sufficient strength and rigidity to safely and securely support the weight of the devices attached to the mounting system 10.

With reference to FIG. 2, the support arm 100 includes a mount assembly engagement feature 120. The mount assembly engagement feature 120 is configured to operatively couple a device mount assembly 200 to the support arm 100. As depicted, the mount assembly engagement feature 120 comprises an opening to receive a mount assembly post 210. The mount assembly post 210 may be securely affixed to the support arm 100 by various techniques, including connecting elements, threaded attachment, welding, press fitting, and combinations thereof. In an alternative embodiment, the mount assembly post 210 is selectively rotatable in relation to at least one the support arm 100 and the device mount assembly 200 such that an attached device may be rotated relative to the mounting surface about, for example, a substantially vertical axis. As shown in FIG. 2, the mount assembly engagement feature 120 is disposed proximate each end of the support arm 100. However, depending on the number of devices to be mounted to mounting system 10, the support arm 100 may have additional or fewer mount assembly engagement features 120. The support arm 100 may also include a plurality of mount assembly engagement features 120, or the mount assembly engagement feature 120 may comprise a slot in order to provide alternative mounting positions for the device mount assembly 200 on the support arm 100 such that, for example, devices of varying dimensions may be readily accommodated. Alternatively, each device mount assembly 200 may be directly or operatively coupled to the support arm 100 with the use of the mount assembly engagement feature 120.

FIG. 2 further shows a surface mount assembly engagement feature 140 disposed on the support arm 100. With reference to FIGS. 1 and 2, the surface mount assembly engagement feature 140 is configured to operatively couple the support arm 100 and the surface mount assembly 400. As depicted, the surface mount assembly engagement feature 140 comprises an opening to receive a surface assembly post 410. The surface assembly post 410 may be securely affixed to the support arm 100 by various techniques, including connecting elements, threaded attachment, welding, press fitting, and combinations thereof. In an alternative embodiment, the support arm 100 is selectively rotatable in relation to surface assembly post 410 about an axis substantially defined by the surface assembly post 410. The surface assembly post 410 may also, or alternatively, be selectively rotatable in relation to the surface mount assembly 400 about an axis substantially defined by the length of the surface assembly post 410, again allowing selective rotation of the support arm 100 in a substantially horizontal plane when the mounting system 10 is attached to an overhead surface.

As depicted in FIG. 1, the surface assembly post 410 generally comprises an elongated tube or post of fixed length. However, in other embodiments, the surface assembly post 410 may comprise, for example, adjustably telescoping tubes that permit the length of the surface assembly post 410 to have a selectively adjustable length to accommodate various mounting conditions. In still further embodiments, the support arm 100 may be attached at various locations along the surface assembly post 410 such that an excess portion of the surface assembly post 410 may be partially received within the mounting system 10 below the support arm 100. The surface mount assembly 400 is configured to secure to a mounting surface (not shown). The mounting system 10, as depicted, is particularly adapted for securement of the surface mount assembly 400 to an overhead surface such as a ceiling or other overhead surface or feature within a structure. However, variations of the surface assembly post 410 and/or the surface mount assembly 400 permit securement of the mounting system 10 to a substantially horizontal feature such as a wall or other structure.

As shown in FIG. 3, the surface mount assembly 400 comprises a lower surface bracket 420 pivotally coupled to an upper surface bracket 430. The surface mount assembly 400 may further include surface attachments 440 configured to attach to the mounting surface or for mating with corresponding structures (not shown) secured to or forming the mounting surface. Alternatively, the upper surface bracket 430 may be directly or operatively attached to the mounting surface. The pivoting connection between the lower surface bracket 420 and the upper surface bracket 430 of the depicted surface mount assembly 400 is particularly well-suited for attachment of the mounting system 10 to an inclined mounting surface or structure, for example, a sloped or cathedral ceiling. In such mounting environments, the lower surface bracket 420 pivots relative to the upper surface bracket 430, allowing the surface assembly post 410 to hang in a substantially vertical orientation regardless of the inclination of the mounting surface.

Figure 4A:
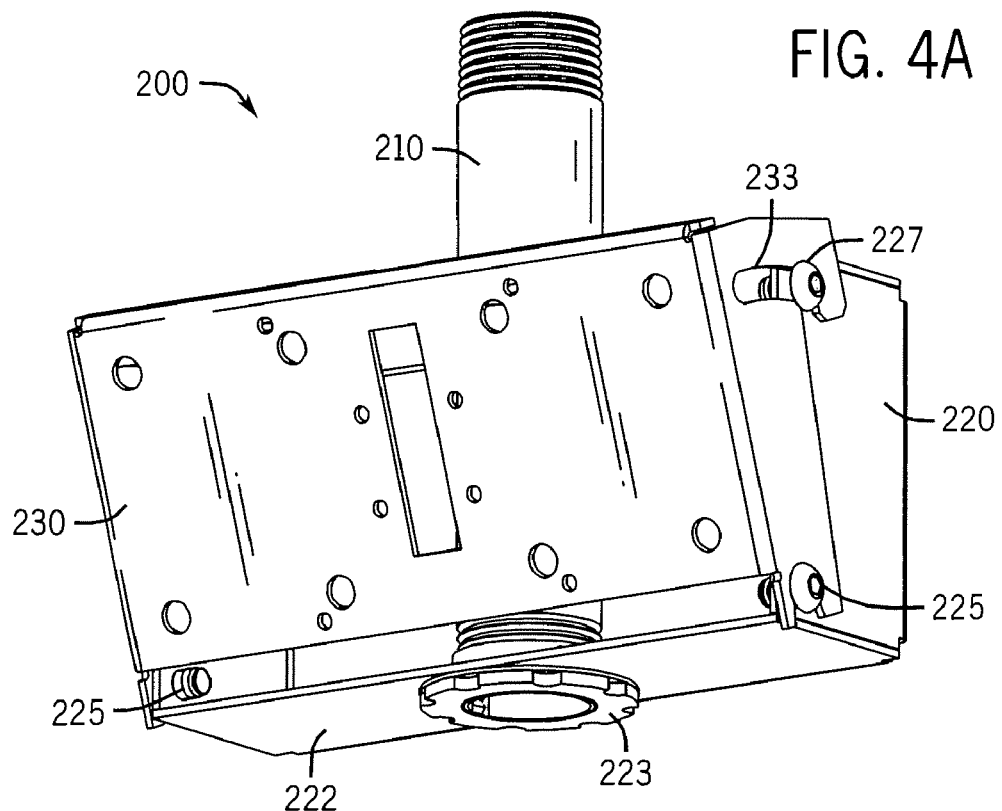
FIG. 4A is a perspective view showing a device mount assembly of the mounting system of FIG. 1.
Figure 4B:
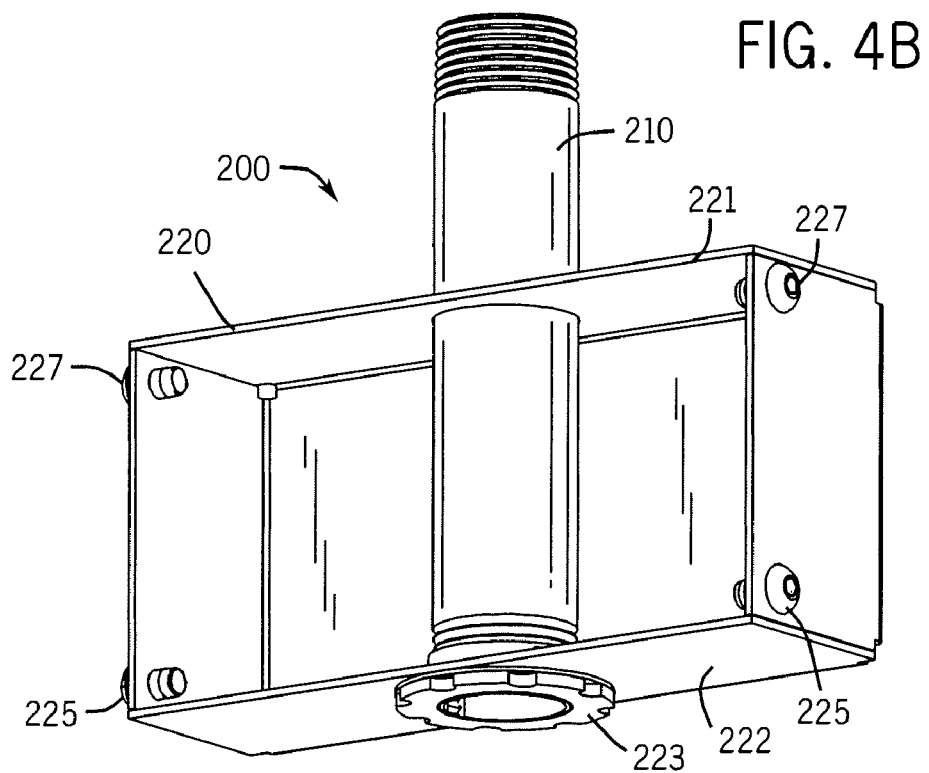
FIG. 4B is a perspective showing the device mount assembly of FIG. 4A, with certain features removed for clarity.

With reference to FIGS. 2, 4A and 4B, the mounting system 10 includes at least one device mount assembly 200 operatively coupled to the support arm 100. The device mount assembly 200 comprises a mount bracket 220 and a tilt bracket 230. The mount bracket 220 is operatively coupled to the mount assembly post 210. As shown in FIG. 4B, the mount assembly post 210 is received in openings disposed in a mount bracket top portion 221 and a mount bracket bottom portion 222. The mount assembly post 210 is threadedly coupled to a collar 223 thereby securing the mount bracket 220 and the mount assembly post 210. However, in alternative embodiments, the mount bracket 220 may be secured to the mount assembly post 210 by other techniques, including welding, connecting elements and combinations thereof. In still other embodiments, the device mount assembly 200 may be directly or operatively coupled to the support arm 100.

As shown in FIG. 1, a device support member 300 is operatively coupled to each of the tilt brackets 230. The device support member 300 may be secured to the tilt bracket 230 by a plurality of connecting elements 305. However, the device support member 300 may be otherwise operatively or directly coupled to the tilt bracket 230. As depicted in FIG. 1, the device support member 300 generally comprises an elongated plate defining a mounting plane that spans substantially the length of the mounting system 10. The device support member 300 is configured to operatively attach to one or more display devices in the mounting plane. As shown, the device support member 300 is operatively coupled to each of the device mount assemblies 200. In this configuration, where the device support member 300 is coupled to a plurality of device mount assemblies 200, the attached display devices are orientated in the display plane and are vertically aligned such that each of the displays is at substantially the same height. Additionally, and as explained in more detail below, the display plane and the plurality of attached display devices may be tilted to a uniform tilt angle.

An attached display device may be directly attached to the device support member 300 or, as shown in FIG. 1, the mounting system 10 may include a plurality of device brackets 350 attachable to the device support member 300. As depicted in FIG. 2, each of the plurality of device brackets 350 comprise an elongated member and may include a device surface 352 having a number of device securement openings 355. In a particular embodiment, the device securement openings 355 may include a plurality of openings adapted to receive connecting elements to secure a device such as a flat panel display to the mounting system 10. The plurality of openings 355 may be located on the device support bracket 350 to align with attachment points on the flat panel display located according to industry standard. An engagement mechanism 357 may extend from the device surface 352 and engage the device support member 300. In a particular embodiment, the engagement mechanism comprises a hook.

As shown in FIG. 1, the device support member 300 includes a top lip 310 and a bottom lip 320. The engagement mechanism 357 engages the top lip 310 and the bottom lip 320, securing each of the device brackets 350 to the device support member 300. As such, the device brackets 350, attached to the standard attachments of the display devices 20, are engaged with the support member 300 via the engagement mechanisms 357 associated with the respective display devices 20, thereby mounting multiple display devices on the mounting system 10 at substantially the same height. This arrangement also permits each of the plurality of device brackets 350 to slide along the length of the device support member 300 and be positioned to accommodate devices of a variety dimensions and mounting configurations. In one configuration, a first display device is attached to a first set of adjacent device brackets 350 and a second display device is attached to a second set of adjacent device brackets 350. Other configurations are also possible, including configurations where two display devices are mounted on two of the adjacent plurality of device brackets 350 in a top-to-bottom orientation, allowing for attachment of up to four display devices to the mounting system 10.

As illustrated in FIG. 5, the mounting system 10 may include a tilt capability such that the device support member 300 and the attached devices may be orientated to at least one tilt angle. The tilt capability is particularly advantageous where the attached devices are flat panel displays that are mounted above typical eye level of a person viewing the attached display devices from either a standing or sitting position. As best seen in FIG. 4A, the tilt bracket 230 may be pivotally coupled to the mount bracket 220 such that the tilt angle of the device support member 300 is continuously adjustable within a tilt angle range. For example, in a particular embodiment, the device support member 300 is selectively tiltable from about 0 degrees (substantially vertical) through about 20 degrees of downward tilt.

With reference to FIG. 4A, the tilt bracket 230 is pivotally coupled to the mount bracket 220 by a pivot element 225 and a pivot guide 227. The pivot element 225 and the pivot guide 227 may comprise a plurality of pins, axles, rods, shafts, connecting elements, other similar elements that permit movement of the tilt bracket 230 in relation to the mount bracket 220, and combinations thereof. The tilt bracket 230 includes at least one tilt guide 233 that guides the movement of the tilt bracket 230 in relation to the mount bracket 220. As shown in FIG. 4A, the tilt guide 233 comprises an opening. However, in other embodiments, the tilt guide 233 can comprise various features including a shaft, rail, protrusion, glide, or other features. With reference to the depicted embodiment, a pair of pivot elements 225 are received proximate the bottom portions of the mount bracket 220 and the tilt bracket 230. A pair of pivot guides 227 are received near an upper portion of the mount bracket 220 and further associated with a pair of tilt guides 233. Accordingly, the tilt bracket 230 may be selectively tilted about an axis substantially parallel to the pair of pivot elements 225. The tilt guides 233 may be configured to prevent the tilt bracket 230 from rotating beyond a defined angle. Further, at least one of the pivot elements 225 and the pivot guides 227 may be selectively adjustable to alter the frictional force between the mount bracket 220 and the tilt bracket 230, thereby increasing or decreasing the difficulty of, or substantially preventing, changing the tilt angle. In a particular embodiment, at least one of the pivot elements 225 and the pivot guides 227 comprise a connecting element threadedly engageable with at least one of the mount bracket 220 and the tilt bracket 230.

The above described configuration permits the devices attached to the mounting system 10 to be selectively tilted to a desired tilt angle. For example, in the case of a flat panel display device, the tilt angle may be adjusted to facilitate viewing the displays from a preferred viewing angle. Where the mounting system 10 is attached to an overhead surface such as a ceiling, the attached displays may be downwardly tilted as shown in FIG. 5 to accommodate viewing of the displays by individuals sitting or standing nearby.

Figure 6:
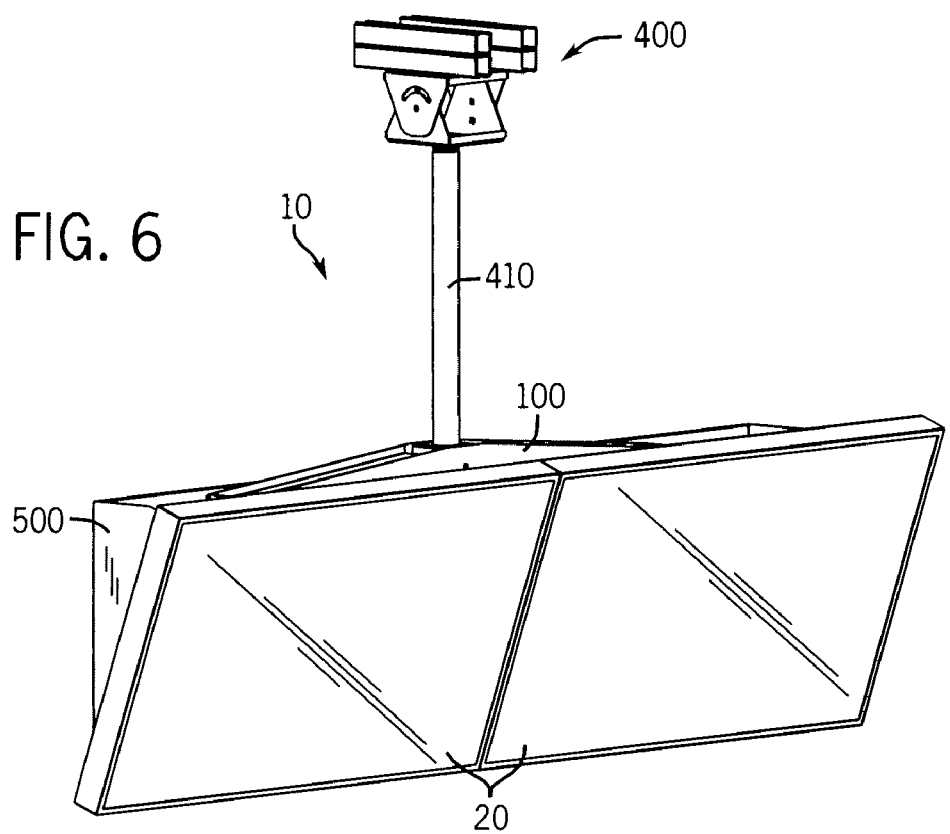
FIG. 6 is a perspective view of the mounting system of FIG. 1 shown with display devices attached thereto.

As previously noted, the mounting system 10 may be configured to support a plurality of display devices. As illustrated in FIG. 1, the device support member 300 spans multiple device mount assemblies 200, defining a display plane. FIG. 6 depicts such a configuration, with a pair of display devices 20 operatively attached to the device support member 300 and tilted to a uniform downward tilt angle. As shown, the plurality of display devices 20 are orientated in the mounting plane and positioned side-by-side. The single support member 300 ensures that the plurality of display devices 20 are at substantially the same height and thus vertically aligned with respect to one another. The mounting system 10 is configured so that the display devices 20 are adjacent to one another and no gap between the display devices 20 is readily apparent to a viewer. This mounting arrangement may be desirable when displaying related information on multiple displays, for example, information associated with an air or train schedule or other types of displayable data such as financial data. This mounting arrangement may also be applicable to video walls comprising an image displayed across a plurality of relatively closely spaced display devices 20. In such an application, the overall visual effect is enhanced by vertical alignment of the display devices 20 mounted on a single display plane. The mounting system 10 may also be configured to provide a gap between each of the plurality of display devices 20.

Figure 7:
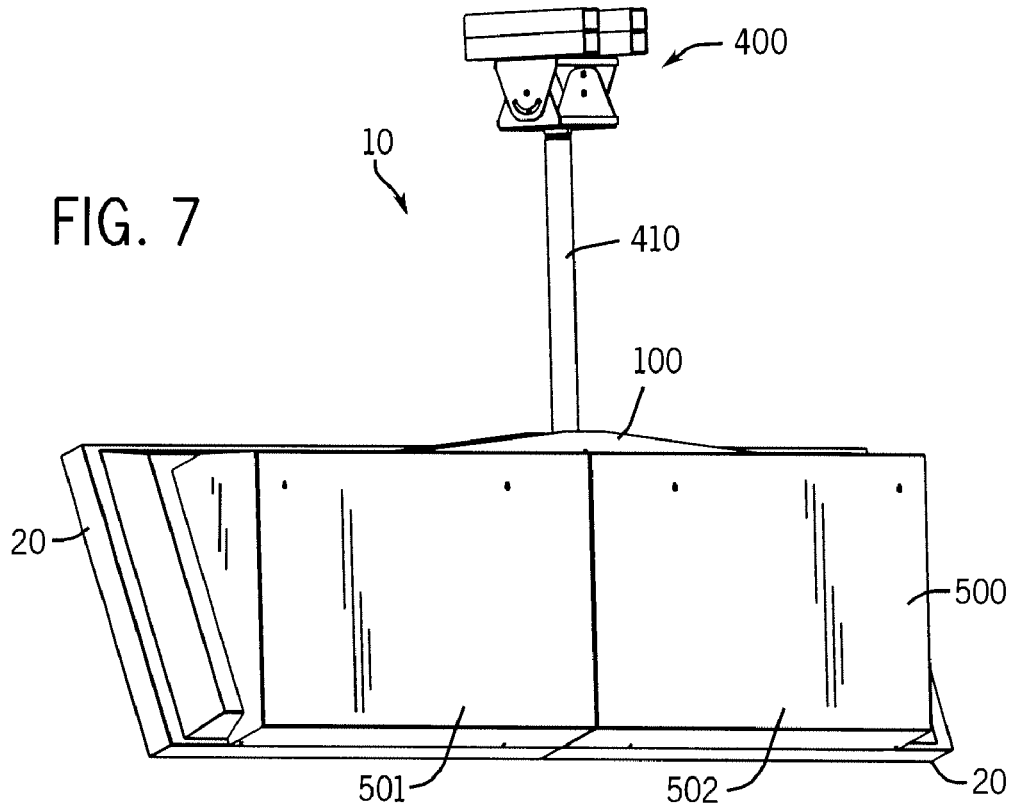
FIG. 7 is a rear perspective view of the mounting system of FIG. 6.

As shown in FIGS. 1 and 7, the mounting system 10 may include a rear cover 500 disposed opposite the display devices 20. As depicted, the rear cover 500 may comprise a first rear cover portion 501 and a second rear cover portion 502. The rear cover 500 is operatively attached to at least one of support arm 100, the device mount assembly 200, and the device support member 300. For example, as illustrated in FIG. 6, the rear cover 500 is coupled to the device brackets 350 via a plurality of struts 505. The rear cover 500 may also include one or more of a lower bracket 510 disposed near the lower portion of rear cover 500 and configured to operatively attach to the attached display devices 20. The rear cover 500 may cover at least a portion of the attached display devices 20, thereby concealing, for example, power and data cables, interfaces, and mounting features. The rear cover 500 may also conceal at least portions of the support arm 100, the device support mount assemblies 200, and/or the device support member 300 for security purposes and or enhanced aesthetics.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described to explain the principles of the present invention and its practical application to enable one skilled in the art to utilize the present invention in various embodiments and with various modifications as are suited to the particular use contemplated.

What is claimed is:

1. A display mount for suspending a plurality of display devices from a non-vertical mounting surface, comprising:
   a support arm configured to operatively attach to the non-vertical mounting surface;
   a plurality of tiltable device mount assemblies operatively coupled to the support arm, each of the plurality of tiltable device mount assemblies comprising:
   a mount bracket; and
   a tilt bracket selectively tillable in relation to a first mount bracket;
   a device support member coupled to each of the tilt brackets, the device support member including an upper engagement lip disposed along an upper portion of the device support member, the device support member configured to operatively attach to a first display device and a second display device vertically aligned in relation to the upper engagement lip and orientated in a display mounting plane,
   wherein the device support member is configured to retain the plurality of attached display devices at substantially the same vertical alignment.

2. The display mount of claim 1, further comprising a rear cover operatively coupled to the device support member, the rear cover configured to conceal the plurality of tiltable device mount assemblies opposite the plurality of display devices.

3. The display mount of claim 2, wherein the rear cover comprises a rear portion, a pair of side panels extending substantially perpendicular from the rear portion toward the device support member, and a bottom panel affixed to the rear portion and each of the pair of side panels.

4. The display mount of claim 3, wherein the rear cover further comprises a plurality of brackets coupled to the bottom panel, each of the plurality of brackets engageable with one of the plurality of display devices.

5. The display mount of claim 2, further comprising:
   a first set of device brackets engageable with the upper engagement lip and attachable to one of the plurality of the display devices; and
   a second set of device brackets engageable with the upper engagement lip and attachable to another of the plurality of the display devices.

6. The display mount of claim 5, wherein the rear cover comprises a rear cover assembly having a first rear cover portion operatively coupled to the first set of device brackets and a second rear cover portion operatively coupled to the second set of device brackets.

7. The display mount of claim 6, wherein the rear cover in configured to tilt about a horizontal axis in response to tilting of the device support member.

8. A display mount for mounting a plurality of displays to an overhead surface, comprising:
   a surface bracket operatively attachable to the overhead surface;
   a support arm operatively coupled to the surface bracket;
   a first device mount assembly operatively coupled to the support arm;
   a second device mount assembly operatively coupled to the support arm and spaced apart from the first device mount assembly; and
   a device support assembly adapted to mount the plurality of displays on a single display plane and selectively tiltable to a plurality of tilt angles, comprising:
   a continuous device support member operatively and tiltably coupled to the first device mount assembly and the second device mount assembly and tiltable in relation to the support arm about a substantially horizontal axis;
   a first set of device brackets attachable to the first display device and coupled to the device support member; and
   a second set of device brackets attachable to a second display device and coupled to the device support member,
   wherein the display mount is configured to retain the first display device and the second display device at substantially the same height and is further configured to continuously maintain the plurality of displays at substantially the same tilt angle in relation to each other.

9. The display mount of claim 8, further comprising a rear cover assembly disposed opposite the continuous device support member and configured to cover a portion of the first device mount assembly and the second device mount assembly.

10. The display mount of claim 9, wherein the rear cover assembly comprises a substantially planar rear cover portion, and a side portion extending from each end of the rear cover portion toward the continuous device support member.

11. The display mount of claim 10, wherein the rear cover portion comprises a first rear cover portion associated with the first set of device brackets and a second rear cover portion associated with the second set of device brackets.

12. The display mount of claim 11, wherein tilting of the continuous device support member causes the rear cover assembly to tilt about a substantially horizontal axis.

13. The display mount of claim 9, wherein the rear cover assembly is dimensioned to substantially conceal the first device mount assembly, the second device mount assembly, and at least a portion of the first display device and the second display device.

14. The display mount of claim 8, wherein each of the first device mount assembly and the second device mount assembly comprise:
a mount bracket operatively coupled to the support arm; and
a tilt bracket rotatably coupled to the mount bracket, the tilt bracket selectively tiltable about a substantially horizontal axis.

15. A display mount for mounting at least two displays to an overhead mounting surface, comprising:
a surface bracket configured to operatively attach to the overhead mounting surface;
a mount post coupled to the surface bracket and extending substantially downwardly from the overhead mounting surface;
a substantially horizontal support arm operatively coupled to the mount post;
a device support member operatively coupled to the substantially horizontal support arm and operatively attachable to the at least two displays and configured to continuously maintain orientation of the at least two displays at a uniform vertical elevation in a mounting plane, the device support member selectively tiltable in relation to the substantially horizontal support arm about a substantially horizontal axis to continuously orientate each of the at least two displays to one of a plurality of tilt angles;
a rear cover operatively coupled to the device support member and tiltable about a substantially horizontal axis in relation to the substantially horizontal support arm in response to tilting of the device support member, the rear cover configured to conceal at least a portion of the display mount opposite the at least two display devices.

16. The display mount of claim 15, further comprising:
a first device mount assembly operatively coupled to the substantially horizontal support arm and affixable to the device support member; and
a second device mount assembly operatively coupled to the substantially horizontal support arm apart from the first device mount assembly and affixable to the device support member.

17. The display mount of claim 15, wherein the device support member includes an upper engagement portion disposed along an upper portion of the device support member and a lower engagement portion disposed along a lower portion of the device support member, and wherein a first outer device bracket and a first inner device bracket attachable to one of the at least two displays are engageable with the upper engagement portion and lower engagement portion and a second outer device bracket and second inner device bracket attachable to another of the at least two displays is engageable with the upper engagement portion and lower engagement portion.

18. The display mount of claim 17, wherein the rear cover includes a rear cover portion extending at least between the first outer device bracket and the second outer device bracket and a pair of side portions protruding substantially perpendicular from the rear portion toward the device support member.

19. The display mount of claim 18, wherein the rear cover includes a bottom portion protruding substantially perpendicular from the rear cover portion toward the device support member and a plurality of lower brackets coupled to the bottom portion, each of the plurality of lower brackets engageable with one of the at least two displays.

20. The display mount of claim 17, wherein the rear cover is operatively coupled to at least two of the first outer device bracket, the first inner device bracket, the second outer device bracket, and the second inner device bracket.

21. A display mount for mounting at least two displays to an overhead mounting surface, comprising:
a surface bracket configured to operatively attach to the overhead mounting surface;
a mount post coupled to the surface bracket and extending substantially downwardly from the overhead mounting surface;
a device support member including an upper engagement portion disposed along an upper portion of the device support member and a lower engagement portion disposed along a lower portion of the device support member, the device support member operatively attachable to the at least two displays and configured to orientate the at least two displays at a uniform vertical elevation in a mounting plane selectively tiltable about a substantially horizontal axis to a plurality of tilt angles;
a first outer device bracket and a first inner device bracket attachable to one of the at least two displays and engageable with the upper engagement portion and lower engagement portion;
a second outer device bracket and second inner device bracket attachable to another of the at least two displays is engageable with the upper engagement portion and lower engagement portion; and
a rear cover operatively coupled to the device support member and tiltable about a substantially horizontal axis in response to tilting of the device support member, the rear cover configured to conceal at least a portion of the display mount opposite the at least two display devices.

22. The display mount of claim 21, wherein the rear cover includes a rear cover portion extending at least between the first outer device bracket and the second outer device bracket and a pair of side portions protruding substantially perpendicular from the rear portion toward the device support member.

23. The display mount of claim 22, wherein the rear cover includes a bottom portion protruding substantially perpendicular from the rear cover portion toward the device support member and a plurality of lower brackets coupled to the bottom portion, each of the plurality of lower brackets engageable with one of the at least two displays.

24. The display mount of claim 21, wherein the rear cover is operatively coupled to at least two of the first outer device bracket, the first inner device bracket, the second outer device bracket, and the second inner device bracket.

* * * * *

UNITED STATES PATENT AND TRADEMARK OFFICE
CERTIFICATE OF CORRECTION

| | | |
|---|---|---|
| PATENT NO. | : 7,952,863 B1 | |
| APPLICATION NO. | : 12/781466 | |
| DATED | : May 31, 2011 | |
| INVENTOR(S) | : Matthew William Stifal | |

It is certified that error appears in the above-identified patent and that said Letters Patent is hereby corrected as shown below:

Column 7, Claim 1, Line 55, "tillable" should be -- tiltable --.
Column 8, Claim 7, Line 28, "in" should be -- is --.

Signed and Sealed this
Twelfth Day of July, 2011

David J. Kappos
*Director of the United States Patent and Trademark Office*